(12) United States Patent
Jouvaud

(10) Patent No.: US 6,553,128 B1
(45) Date of Patent: Apr. 22, 2003

(54) INSTALLATION FOR DISTRIBUTING A STOCK OF GAS CYLINDERS

(75) Inventor: Dominique Jouvaud, Paris (FR)

(73) Assignee: L'Air Liquide - Societe Anonyme a Directoire et Conseil de Surveillance pour l'Etute et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/418,984

(22) Filed: Oct. 14, 1999

(30) Foreign Application Priority Data

Oct. 14, 1998 (FR) .......................................... 98 12873

(51) Int. Cl.⁷ ................................................ G06K 9/00
(52) U.S. Cl. ...................... 382/100; 382/103; 348/169; 705/28; 340/5.2
(58) Field of Search ................................ 382/103, 115, 382/100; 705/28; 340/5.1, 5.2, 5.8; 348/169

(56) References Cited

U.S. PATENT DOCUMENTS

| | | | | |
|---|---|---|---|---|
| 3,651,478 A | | 3/1972 | Shandlay | |
| 4,586,441 A | * | 5/1986 | Zekich | 109/38 |
| 5,313,393 A | * | 5/1994 | Varley et al. | 194/205 |
| 5,455,561 A | * | 10/1995 | Brown | 340/541 |
| 5,471,239 A | * | 11/1995 | Hill et al. | 348/155 |
| 5,587,929 A | * | 12/1996 | League et al. | 342/118 |
| 6,097,429 A | * | 8/2000 | Seeley et al. | 348/154 |
| 6,363,366 B1 | * | 3/2002 | Henty | 382/110 |
| 6,404,455 B1 | * | 6/2002 | Ito et al. | 348/169 |

FOREIGN PATENT DOCUMENTS

| | | |
|---|---|---|
| JP | 63 231098 | 9/1988 |
| WO | WO 93/00644 | 1/1993 |

* cited by examiner

*Primary Examiner*—Samir Ahmed
*Assistant Examiner*—Anand Bhatnagar
(74) *Attorney, Agent, or Firm*—Young & Thompson

(57) ABSTRACT

This installation for the distribution of a stock of gas cylinders (16, 18) comprises a storage space (12) for the cylinders which is equipped with means (32, 34) for evaluating the stock of cylinders with a view to restocking the installation. The stock-evaluation means include means (32) for image capturing the storage space which are connected to synchronization means for periodic image capturing of the storage space and a central processing unit (34) which compares the pictures successively delivered by the image capturing means (32).

9 Claims, 2 Drawing Sheets

INSTALLATION FOR DISTRIBUTING A STOCK OF GAS CYLINDERS

BACKGROUND OF THE INVENTION

1. Field of the Invention

The present invention relates to an installation for distributing a stock of gas cylinders.

2. Description of the Related Art

The use of bottled industrial gases is very common throughout industry. A consumer enterprise generally has a central depot to which the supplier delivers the gas cylinders as ordered. The cylinders are distributed from this central depot to the different departments of the enterprise for delivery by the personnel to their point of use. These are referred to as "flying" cylinders to distinguish them from "manifold-connected" cylinders which are delivered and connected by the supplier to their points of use.

As far as flying cylinders are concerned, their use within an enterprise raises a number of problems, in particular because the number of full cylinders available is not monitored. A user can therefore remove the last full gas cylinders of a certain type without ordering new ones, whether through negligence or forgetfulness.

Moreover, it sometimes happens that several users will independently put in orders for cylinders of the same type, and this may lead to overstocking, which takes up space in the depot.

In order to remedy these drawbacks, some installations are provided with a set of sensors which are arranged close to each cylinder support and can detect the presence or absence of the cylinders. This technique allows an accurate value of the cylinder stock to be obtained in real time. It does, however, have a number of disadvantages, especially because it makes it necessary to provide one sensor per cylinder and, consequently, to equip the installation with a cabling network whose complexity increases with the storage capacity, and with a relative complex unit for processing the signals delivered by the sensors, which make the installation relatively expensive.

SUMMARY OF THE INVENTION

The object of the invention is to remedy this drawback.

It therefore relates to an installation for the distribution of a stock of gas cylinders, comprising a storage space for the gas cylinders which is equipped with means for evaluating the stock of cylinders with a view to restocking the installation, characterized in that the stock-evaluation means include means for image capturing the storage space which are connected to synchronization means for periodic image capturing of the storage space and a central processing unit which compares the pictures successively delivered by the image capturing means.

An accurate value of the stock of cylinders is thus provided, irrespective of the capacity of the storage space.

The distribution installation may furthermore have one or more of the following characteristics, taken individually or in any technically feasible combination:

- the central processing unit furthermore includes means for comparing the stock of cylinders which is evaluated by the stock-evaluation means with a predetermined threshold value, below which the storage space needs to be restocked;
- it furthermore includes an identification-badge reader which is arranged close to a door for access to the storage space and is connected to the image capturing means, with a view to taking at least one picture of the storage space if it is penetrated by an unauthorized individual;
- it includes a reference marker which faces the image capturing means and in front of which the gas cylinders are placed;
- it includes means for illuminating the stock of cylinders;
- the means for evaluating the stock of cylinders include image-processing means comprising spectral-analysis means which are connected to the image capturing means and are interfaced with shape-recognition means for identifying the gas cylinders;
- the stock-evaluation means include, associated with the image-processing means, means for storing a set of data words which each correspond to one gas cylinder and contain at least one bit whose value indicates the presence or absence of the cylinder;
- it includes alarm means which are connected to the stock-evaluation means with a view to emitting an alarm signal if an individual or an object is detected in front of the image capturing means for a period of time longer than a predetermined threshold value.

BRIEF DESCRIPTION OF THE DRAWINGS

Other characteristics and advantages will become apparent from the following description, given solely by way of example and with reference to the appended drawings, in which.

DESCRIPTION OF THE PREFERRED EMBODIMENTS

Figure 1:
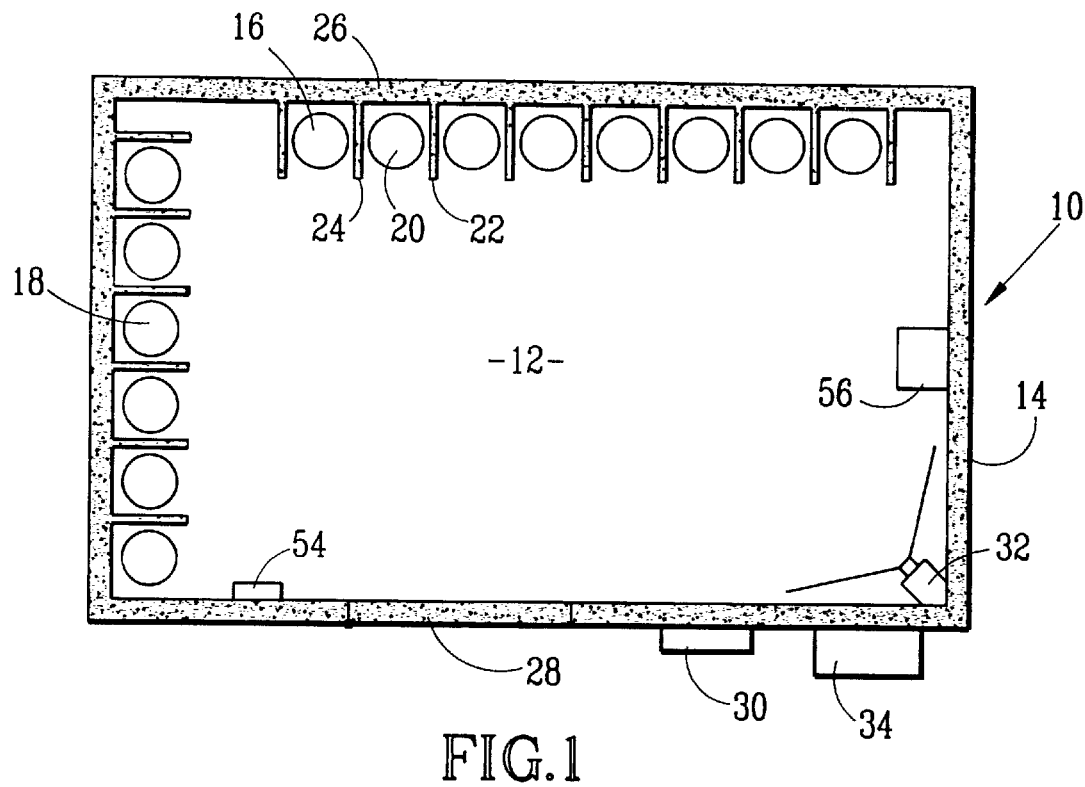
FIG. 1 is a diagrammatic view of an installation for distributing a stock of gas cylinders according to the invention.

FIG. 1 represents an installation 10 for distributing a stock of gas cylinders. This installation includes a storage space 12 for the cylinders, which is located inside a normally closed premises 14. Various cylinders, such as 16 and 18, are placed inside the storage space 12. Each cylinder is housed in a compartment 20 reserved for this purpose, delimited by horizontal bars or vertical partitions, such as 22 and 24, which are fixed against walls, such as 26, of the premises 14.

As is conventional, the gas cylinders 16 and 18 are preferably arranged in pairs, namely one empty cylinder and one cylinder filled with gas, and are grouped by gas types, for example acetylene and oxygen, at a distance away from one another.

The full cylinders are for distribution to users, preferably after the latter have returned corresponding empty cylinders, and the empty cylinders are to be taken away and/or exchanged by the cylinder supplier in exchange for full cylinders.

As can be seen in FIG. 1, the storage space 12 is accessible through a door 28, preferably of the automatic closing type, whose locking device is connected to a badge reader 30 so as to grant access to the storage space 12 only to authorized or duly registered individuals.

The installation includes means for evaluating the stock of cylinders so as to allow automatic restocking of the installation as soon as the stock of full cylinders reaches a predetermined critical threshold.

In the embodiment in FIG. 1, the stock-evaluation means include means 32 for image capturing at least a substantial part of the storage space 12, which consists of one or more video cameras, the number of which is chosen as a function of the image capturing angle and the number of racks of cylinders to be monitored.

The stock-evaluation means furthermore include a central processing unit 34 which is arranged in a control cabinet and to which the image capturing means 32 are connected. The central processing unit 34 includes an image-processing stage 36 for processing the pictures delivered by the image capturing means 32, and a stock-management stage 38.

The installation is supplemented by an online monitoring unit 40 which is situated away from the installation, and in which restocking instruction signals delivered by the stock-management stage 38 are received.

Figure 2:
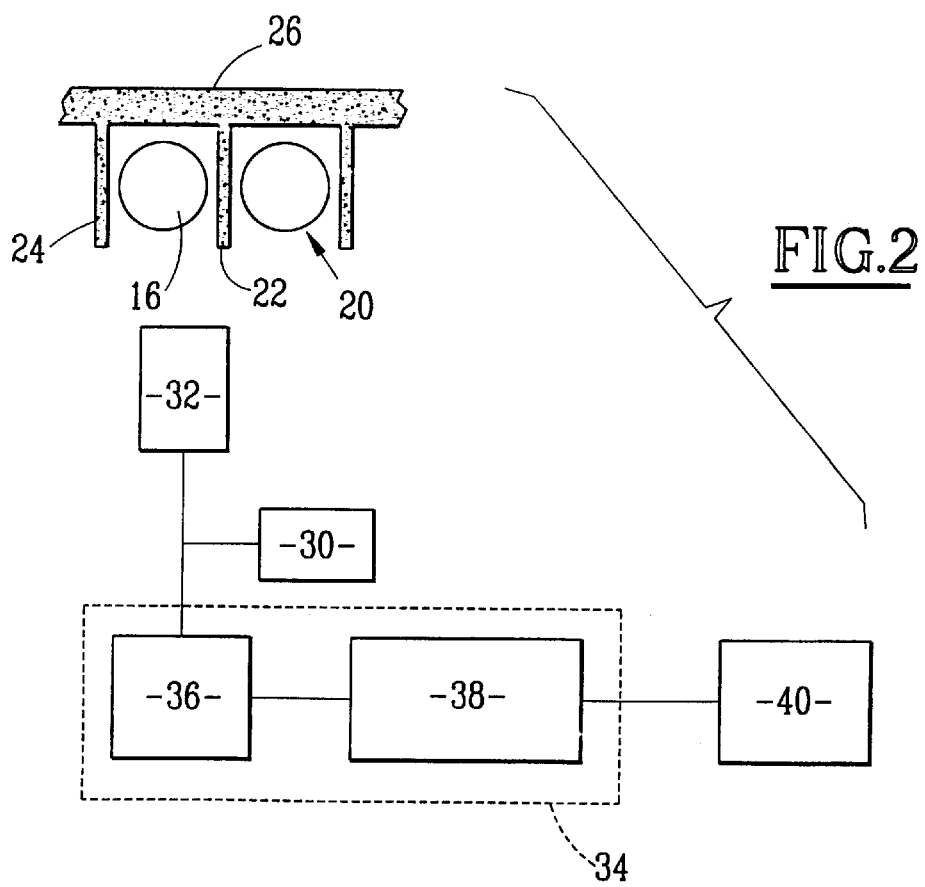
FIG. 2 is an overall diagram of the installation in FIG. 1.

This FIG. 2 moreover shows that the image capturing means 32 are furthermore coupled to the identification-badge reader 30 and, optionally, to the device for locking the door 28, so as to take pictures of the storage space 12 when an unauthorized individual has attempted to penetrate, or has actually penetrated, inside the storage space 12.

A detailed description of the image-processing stage 36 will now be given with reference to FIG. 3.

Figure 3:
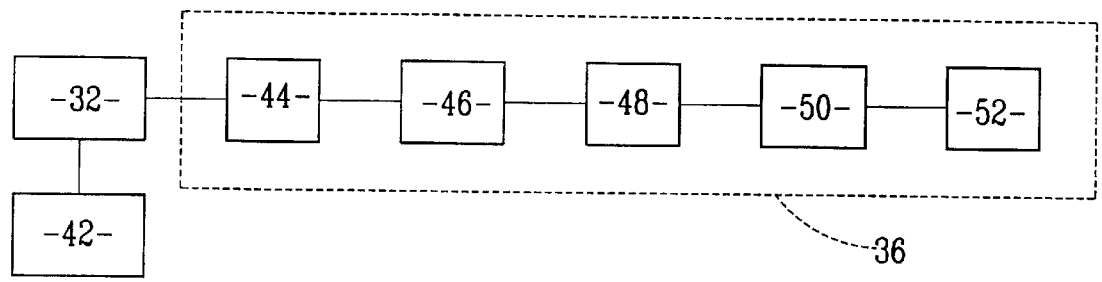
FIG. 3 is an overall diagram of the image-processing means of the installation in FIG. 1.

As shown by this FIG. 3, each camera 32 is connected to a synchronizing device 42, for example consisting of a conventional type of clock, controlling the camera 32 so as to take a picture at predetermined time intervals, for example every 15 ms.

The video images thus taken are delivered to the input of the processing unit 36 which, at its input, has an input/output interface 44, itself connected to an analog/digital converter 46.

The converter 46 is connected to a spectral-analysis stage 48 which uses conventional techniques, for example with the aid of an autocorrelation calculation, to calculate a spectral analysis of the pictures delivered by the camera 32.

The spectral-analysis stage 48 is connected to a conventional type of shape-recognition stage 50 which can detect the presence of cylinders in the pictures delivered by the image capturing means 32, for example by comparing them with models obtained by previous learning.

Furthermore, the shape-recognition stage 50 incorporates an encoding algorithm which forms a set of words which each correspond to one cylinder-storage location 20 and are coded, for example, over 8 bits.

For example, the words formed in this way include a bit set which encodes the address of the storage location 20, and one or more bits whose value indicates the presence or absence of a cylinder in the location 20.

As shown by FIG. 3, the shape-recognition stage 50 is connected to a memory 52, for example of the random-access memory type, which stores the words delivered in this way at successive addresses which each correspond to one storage location 20.

The file created in this way is periodically sent to the stock-management stage 38, in which the successively delivered files are compared with one another in order to obtain an accurate indication of the variation in the stock of cylinders as a function of time.

Moreover, the number of cylinders stored in the storage space 12 is compared in the management stage 38 with a predetermined threshold value, below which a restocking instruction signal is sent to the online monitoring system 40 so as to initiate restocking of the storage space 12.

As mentioned above, the image capturing means 32 are optionally coupled to the badge reader 30 and, where applicable, to the device for locking the door 28 in order to take, with a view to recording it, at least one picture of a not previously authorized individual who has entered the storage space 12.

Referring again to FIG. 1, the installation is advantageously furthermore provided with an alarm unit 54 which is connected to the image capturing means 32 and to the synchronization device 42, in order to cause an alarm signal to be emitted, for example an audible signal, in the case of detecting the presence of an individual or an object lying in front of the image capturing means 32 and hiding the cylinders 16 and 18 for a period of time longer than a predetermined threshold value.

Lastly, FIG. 1 shows that the installation may be supplemented by lighting means 56 capable of providing enough light for the installation to operate, even in case of low intensity.

Figure 4:
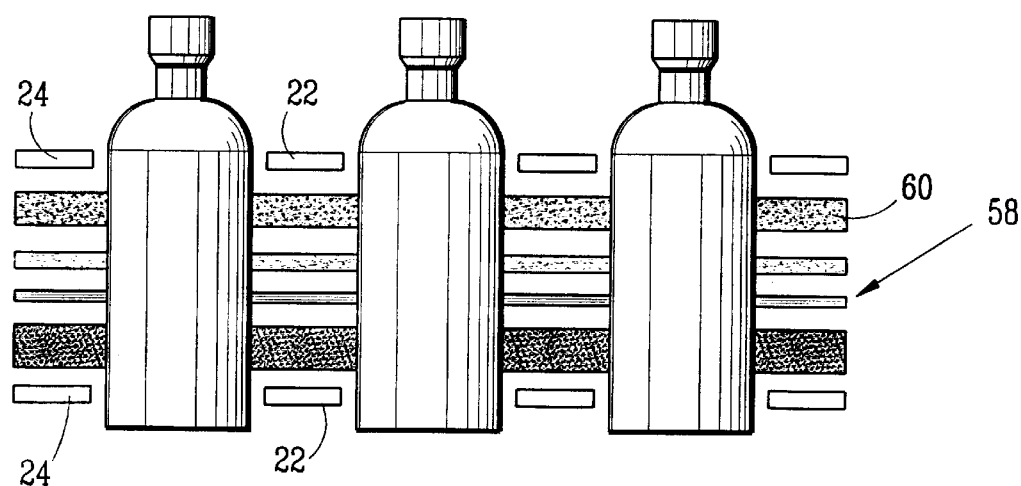
FIG. 4 is a front view of one of the walls of the storage space.

Referring lastly to FIG. 4, it can be seen that the wall 26 of the premises 14 is preferably provided with a reference marker 58 which faces the image capturing means 32 and in front of which the cylinders are placed. The reference marker 58 consists of a combination of horizontal lines, such as 60, which have different thicknesses and gray levels, so as to make it possible to increase the sensitivity of the installation even in the case of dim light or in the case of low contrast, or alternatively when shadows are cast on the cylinders.

What is claimed is:

1. An installation for the storage and distribution of gas cylinders, comprising:

a storage space selectively accessible to users via a control access door and having a plurality of stationary individual storage locations for receiving gas cylinders, access control means for selectively allowing opening of the access door, image capturing means located in the storage space for observing at least the storage locations, and at least one processing unit connected to the image capturing means and to the access control means for periodically comparing successive pictures taken by the image capturing means.

2. The installation of claim 1, wherein the access control means comprises at least one user identification means.

3. The installation of claim 1, further comprising alarm means actuatable by the processing unit.

4. The installation of claim 1, wherein each storage location includes a reference marker which faces the image capturing means and in front of which the gas cylinder is placed.

5. The installation of claim 1, wherein each storage location includes lighting means for selectively illuminating at least the storage locations.

6. The installation of claim 1, wherein the processing unit includes image-processing means comprising spectral-analysis means interfaced with shape-recognition means for identifying the gas cylinders placed in the storage location.

7. The installation of claim 6, wherein the image-processing means includes storage means for storing a set of data words which each correspond to one observed gas cylinder and contain at least one bit whose value indicates the presence or absence of the cylinder in the storage location.

8. The installation of claim 1, wherein the storage locations are arranged by pairs.

9. An installation for storage and monitoring of gas cylinders, comprising:

a storage space comprising a plurality of compartments;

a lockable door allowing entry by an individual to the storage space;

means for unlocking the lockable door for authorized individuals;

at least one video camera positioned to allow capture of an image representing at least a substantial part of the storage space;

a central processing unit connected to the at least one video camera, the central processing unit comprising an image-processing element and a stock-management element, the central processing units being constructed and arranged to detect a presence of the cylinders in the images captured by the at least one video camera, and comparing successive said images from the at least one video camera.

* * * * *